J. N. WARD.
Car Brake.

No. 21,996.

Patented Nov. 2, 1858.

UNITED STATES PATENT OFFICE.

J. N. WARD, OF BROOKLYN, NEW YORK.

CAR-BRAKE.

Specification of Letters Patent No. 21,996, dated November 2, 1858.

*To all whom it may concern:*

Be it known that I, J. N. WARD, of Brooklyn, in the county of Kings and State of New York, have invented certain new and useful Improvements in Brakes for Railroad-Cars; and I do hereby declare the following to describe and ascertain the same, reference being had to the accompanying drawing, in which—

Figure 1:
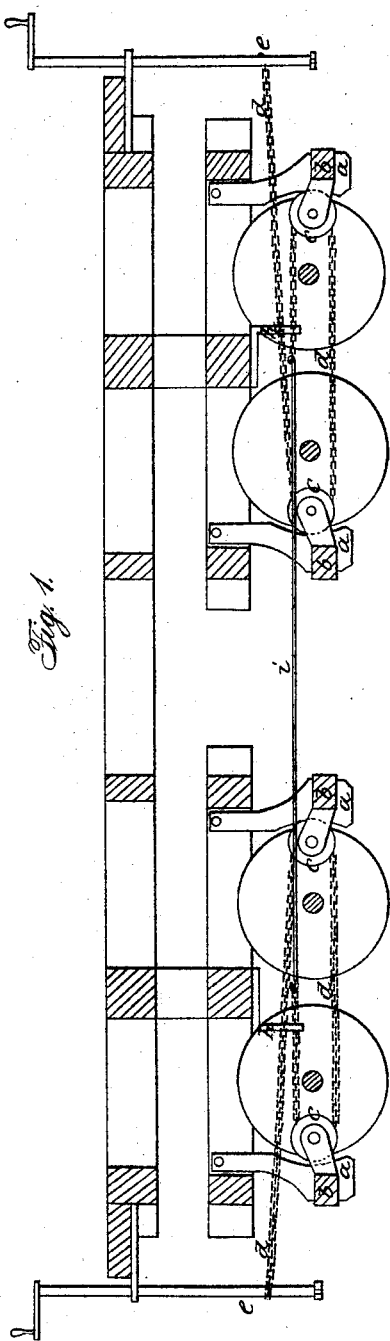
Figure 2:
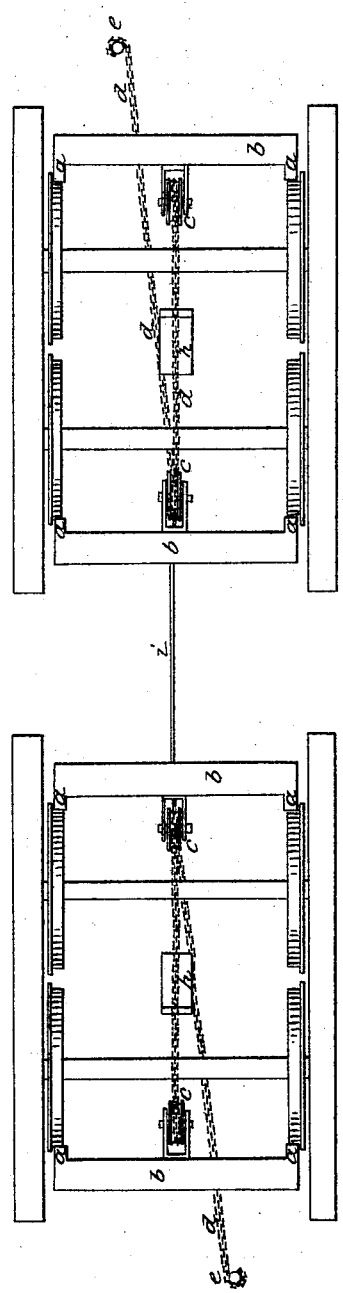

Figure 1 is an elevation; Fig. 2 a plan.

My invention consists in the combination and arrangement of brakes and pulleys by which I am enabled to produce a more direct and perfect action than has heretofore been done. I am aware that brakes and pulleys have been heretofore used, but with complex and intermediate levers.

This brake is constructed as follows: The trucks are made in the ordinary way and have suspended opposite each wheel outside a brake piece $a$ as is ordinarily done when outside brakes are used. A stout bar $b$ extends from one brake piece $a$ to the one opposite thereto across the car and to the center of this bar a pulley $c$ is affixed. As each pair of brakes $a$ are thus furnished the two pulleys on each truck stand opposite each other as seen in Figs. 1, 2. A chain passes around these pulleys (lettered $d$ in the drawing) and one end of it is affixed to the ordinary upright windlass $e$ at the end of the car. The other extends back to the other truck and around the pulleys of the brakes thereon like that first described and thence to the windlass on the opposite end of the car. By this arrangement it will be seen I have a powerful direct acting brake not liable to derangement easily constructed and adjusted. If more power is wanted the purchase may be doubled by using two sheaves or pulleys instead of one and carrying the chain around it.

Having thus fully described my device what I claim therein and desire to secure by Letters Patent is—

The combination of the pulleys and brakes together with the mode of operating the same the whole being constructed and arranged as herein specified and for the purposes set forth.

J. N. WARD.

Witnesses:
 GEO. PATTEN,
 A. ROTHWELL.